United States Patent [19]
Katsumata et al.

[11] Patent Number: 5,556,608
[45] Date of Patent: * Sep. 17, 1996

[54] CARBON THREAD AND PROCESS FOR PRODUCING IT

[75] Inventors: Makoto Katsumata; Hidenori Yamanashi; Hitoshi Ushijima, all of Shizuoka, Japan

[73] Assignee: Yazaki Corporation, Tokyo, Japan

[ * ] Notice: The term of this patent shall not extend beyond the expiration date of Pat. No. 5,399,330.

[21] Appl. No.: 354,052

[22] Filed: Dec. 6, 1994

Related U.S. Application Data

[62] Division of Ser. No. 47,066, Apr. 28, 1993, Pat. No. 5,399,330.

[30] Foreign Application Priority Data

Feb. 15, 1991 [JP] Japan ..................... 3-042331

[51] Int. Cl.$^6$ ..................... D01F 9/12
[52] U.S. Cl. ..................... 423/447.4; 264/29.2
[58] Field of Search ............. 423/445 R, 447.2, 423/447.4; 264/29.5, 29.1, 29.2

[56] References Cited

U.S. PATENT DOCUMENTS

| | | | |
|---|---|---|---|
| 2,957,756 | 10/1960 | Bacon | 423/447.3 |
| 4,998,709 | 3/1991 | Griffin et al. | 264/29.5 |
| 5,308,598 | 5/1994 | Coates | 423/447.2 |
| 5,399,330 | 3/1995 | Katsumata et al. | 423/445 R |

FOREIGN PATENT DOCUMENTS 89-07163  8/1989  WIPO ..................... 423/447.3

*Primary Examiner*—Steven Bos
*Assistant Examiner*—Stuart L. Hendrickson
*Attorney, Agent, or Firm*—Nikaido, Marmelstein, Muray & Oram LLP

[57] ABSTRACT

In a carbon thread, vapor phase growth carbon fiber (VGCF) are dispersedly contained in a carbon matrix. The carbon thread is produced by forming a thread-like element from a mixture of VGCF and carbonizable carbon-containing compound and then by heat-treating the thread-like element to effect carbonization thereon. The thread-like element may be formed either by melt-spinning or solution-spinning the mixture, or by impregnably adhering the mixture onto a thread of heat resisting fibers. The carbonized carbon thread thus obtained may be subjected to further heat treatment to graphitize the carbon thread.

5 Claims, No Drawings

CARBON THREAD AND PROCESS FOR PRODUCING IT

This is a division of application Ser. No. 08/047,066 filed Apr. 28, 1993, now U.S. Pat. No. 5,399,330.

BACKGROUND OF THE INVENTION

1. Field of the Invention

The present invention relates to a high-conductivity carbon thread usable as a light, conductive element, and, more particularly, to a graphitized carbon thread. The present invention also relates to a process for producing the high-conductivity carbon thread.

2. Related Background Art

Carbon or graphite threads are produced in a method comprising baking fibers of polyacrylonitrile (referred to as PAN) or by a method of melt-spinning a coal-originated or a petroleum pitch, subjecting the spun fiber to infusible treatment, then baking it, and, if necessary, further to effect thereon heat treatment at a high temperature for graphitization. The former is called PAN-type carbon fibers and the latter is called pitch-type fibers. These fibers are generally used for reinforcement. To obtain high elasticity and high strength, as many impurities, presenting a hindrance to the carbonization or the graphitization are removed as possible from the precursor material, i.e., PAN or pitch. However, the thus-produced carbon fibers using Such refined precursor materials do not show high enough conductivity after the graphitization. For example, a conductivity of about $1 \times 10^3$ S/cm is common for PAN type carbon fibers, and about $2 \times 10^3$ S/cm for pitch-type carbon fibers. It is considered that this low conductivity is due to insufficient spreading of the hexagonal carbon as a whole network even after the graphitization which allows many grain boundaries and defects to still exist.

On the other hand, vapor-phase growth carbon fibers, referred to as VGCF, obtained by thermal decomposition of gasified organic compound at a high temperature, show high conductivity, but generally have a short fiber length. Therefore, use of VGCF is limited. Among the known VGCF, the fibers described in Japanese Unexamined Patent Publication Tokkaisho 57-117622 are relatively long with an average diameter of 10 µm and a length of approx. 20 cm. These fibers have satisfactory conductivity of $2 \times 10^4$ S/cm after the graphitization. It is, however, difficult to use the VGCF as a conductive wire, since the fibers are discontinuous as well as lacking in mass-producibility.

SUMMARY OF THE INVENTION

The present invention is intended to provide a light, strong conductive wire, substitutable for metal conductive wires which exhibit insufficient strength compared to their weights. More specifically, an object of the present invention is to provide a long thread, comprising carbon fiber with high conductivity, which has been impossible to attain by conventional techniques. Also, it is another object of the present invention to provide a process for producing such a carbon thread.

The above objects of the present invention may be accomplished by a carbon thread in which vapor-phase growth carbon fibers are dispersedly contained in a carbon matrix. Such a carbon thread may be produced by either melt or solution spinning a mixture of vapor-phase grown carbon fibers and carbonizable carbon-containing compound into a thread-like form or by impregnatingly adhering such a mixture onto a heat-resisting fiber, and then effecting carbonization heat treatment of the thus-obtained impregnated thread. If necessary, the above-obtained carbon thread may be subjected to further heat treatment to effect graphitization thereof, which may add an especially superior property to the thread.

DETAILED DESCRIPTION OF THE PREFERRED EMBODIMENTS

The vapor-phase carbon fibers or VGCF which is a precursor of carbon thread of the present invention, may be produced in a base plate method as disclosed, for instance, in Japanese Examined Patent Publication Tokkosho 58-103528, in which a heat resisting base plate, carrying growth nuclei of fine grain transition metal, is placed in a reactor, a mixed gas of hydrocarbon and hydrogen is brought into contact with the base plate, which is heated, for example, at 1030° to 1300° C., for thermal decomposition, and fibers are grown on the plate with diameters between a few and several tens of µm and lengths between a few and several tens of cm. Also the VGCF may be produced in a fluid bed method as disclosed, for example, in Japanese Unexamined Patent Publication Tokkaisho 58-180615, in which growth nuclei of fine grams of transition metal are suspended in a reaction zone of a reactor heated to 950° to 1300° C., mixed gas of hydrocarbon and hydrogen is passed therethrough for thermal decomposition, and fibers grow the reaction zone on the fine grains of transition method with diameters between 0.1 and 0.5 µm and lengths between 10 and 500 µm.

The VGCF, as produced by the above-described methods, are crushed to have lengths of less than 5 mm. This crushing is not essential, but preferable because the VGCF having not too long a length are ready to be blended with a carbonizable carbon-containing compound, as is hereinafter called for as a matrix compound, and is convenient for the following processes. Further, the VGCF may be heat-treated at a temperature between 1800° and 2600° C. to be graphitized. This pre-graphitization is not always necessary. Because the graphitization of VGCF readily proceeds upon high temperature heat treatment after the formation of thread-like mixture comprising VGCF.

Furthermore, the VGCF may be subjected to a nitric acid treatment, the plasma oxidation treatment, the coupling agent treatment, or other treatments so as, to reform the surfaces whereby to improve their ability to adhere to the matrix compound. Such treatments are not essential, so that no inconvenience will be caused it such treatments are not carried out.

The matrix compound, being one of raw materials of the carbon thread, may be selected from PAN, pitch, or the like, which are generally used to produce carbon fibers, and carbonizable/graphitizable carbon-containing compounds such as thermoplastic resins, e.g., polyvinyl chloride, etc. and as thermosetting resins, e.g., phenol resins, furan resins, etc. In particular, it is preferable to choose a carbon-containing compound which may easily develop the graphite structure upon heat treatment. The matrix compound, however, is not limited to the above-listed materials, but may also be selected from other materials and still be within the scope of the present invention.

When said VGCF and matrix compound are blended, the matrix compound may be heated to melt it if necessary, or it may be liquefied by the use of solvents or the like, whereby the VGCF and matrix material are readily mixed together. Further, if close kneading of the mixture is required, conventionally known kneading machines and methods may be properly employed.

The blending ratio of VGCF to the matrix compound normally ranges 1 to 80% by weight depending on a shape of VGCF, the kind or the property of the matrix compound, and other matters. If the amount of VGCF is below 1% by weight of the mixture the carbon thread made therefrom fails to have sufficiently high conductivity. If it is over 80% by weight, it is difficult to produce uniform carbon threads.

To obtain the thread-like form of the above mixture according to the present invention, the mixture is extruded and spun from a spinning nozzle by means of conventional melt-spinning or solution spinning technique. The spun thread may be stretched to enhance the orientation of VGCF if necessity. When pitch or thermoplastic resins, such as polyvinyl chloride, etc. are used as the matrix compound, the spun thread thereof is heat-treated, for example, at a temperature below 600° C. in air to make it infusible, and further baked, for example, at a temperature lower than 2000° C. in an inert gas atmosphere to form the carbon thread.

Also, when thermosetting resins are used as the matrix compound providing the mixture in liquid form, the liquid mixture may be impregnated with and adhered to a core material of heat-resisting fibers such as glass fibers, carbon fibers, aramid fibers, etc. The thus-obtained thread-like element is carbonized in the same manner as described above, to provide the carbonized thread.

The carbon thread produced as described above has an excellent conductive property, since a VGCF of superior conductivity are dispersedly contained in the carbon matrix. The carbon thread may be changed into a graphitized carbon thread by further heat-treatment at a temperature over 2000° C. in an inert gas atmosphere. During the graphitization, the VGCF is also further graphitized as well as the carbon matrix, so that the carbon thread thus obtained has even better conductivity.

(Example 1)

Fifty parts by weight of VGCF with an average diameter of 0.3 μm and an average length of 100 μm, which were produced by the fluid bed method as described in the afore-mentioned Tokkaisho 58-180615, and a hundred parts by weight of molten coal tar pitch, with a softening point of 80° C. were mixed together. After melt-spinning the mixture, the thread was subjected to a treatment at a temperature of 350° C. in air to make it infusible. Then the thread was baked for thirty minutes at 2800° C. in an argon atmosphere to be graphitized.

The conductivity of the thus-obtained graphitized carbon thread with a diameter of 0.02 mm was measured by the four terminal method. The measured value of conductivity was $2 \times 10^4$ S/cm.

(Example 2)

Fifty parts by weight of the same VGCF as was used in Example 1, with an average diameter of 0.3 μm and an average length of 100 μm, and an ethanol solution of fifty parts by weight of resol-type phenol resin were uniformly mixed. A core material of PAN-type carbon fibers (TORAY, T-300, number of filaments: 1000, total size: 66 g/1000 m, density: 1.76 g/cm$^3$) were dipped in the above mixture, taken out thereof, and dried for thirty minutes at 80° C. Further, two more cycles of this impregnating operation were repeated, whereby thread-like elements were obtained, in which the VGCF mixed resin was adhered to the PAN fibers in a weight of by 54 g/1000 m.

The thread-like elements were subjected to a heat treatment at 180° C. to be hardened, then to an oxidation treatment at a temperature of 350° C. in air, and further to a graphitization by baking them for thirty minutes at 2800° C. in an argon atmosphere.

The conductivity of the thus-obtained graphitized carbon thread, with a diameter of 0.3 mm was measured by the four terminal method. The measured value of conductivity was $1.2 \times 10^4$ S/cm.

As described above, the present invention provides carbon threads having excellent conductivity as compared with conventional carbon threads. The carbon thread of the present invention is light and high in chemical resistance with a high conductivity, so that it may be suitably used as a conductive wire.

What is claimed is:

1. A process for producing a carbon thread having improved electrical conductivity, comprising the steps of:

a) forming a substantially uniform mixture of vapor phase growth carbon fibers (VGCF) and a carbonizable organic compound, b) converting said mixture into a continuous thread form, and c) carbonizing said thread form to obtain a carbonized thread having sufficiently improved electrical conductivity as compared to the electrical conductivity Of said VGCF to be useful as an electroconductive element, wherein said mixture comprises proportions of said VGCF and said carbonizable organic compound sufficient to enhance the electrical conductivity of said continuous carbon thread form and increase the length of the continuous thread form as compared to the electrical conductivity and the length, respectively, of the VGCF from which it was made.

2. The process according to claim 1, wherein said converting comprises spinning said mixture.

3. A process for producing a carbon thread as claimed in claim 1 further comprising: crushing said VGCF fibers to have lengths of less than 5 mm long and then mixing said crushed VGCF with said carbonizable carbon-containing compound.

4. A process for producing a carbon thread of improved electrical conductivity comprising the steps of:

a) spinning a mixture of vapor phase growth carbon fibers (VGCF) and a carbonizable carbon-containing compound to form a spun thread of the mixture which is longer than said VGCF, and b) heat-treating the spun thread of the mixture to carbonize the spun thread, wherein:

the composition of said spun thread and the conditions of said heat treating are sufficient to enhance the electrical conductivity thereof to be greater than the electrical conductivity of said VGCF and said spun thread has an electric conductivity which makes it suitable for use as an electroconductive element.

5. The process according to claim 4, further comprising graphitizing after step b.

* * * * *